(12) United States Patent
Acosta Gonzalez

(10) Patent No.: US 9,829,868 B2
(45) Date of Patent: Nov. 28, 2017

(54) CO-ORDINATED SENSORLESS CONTROL SYSTEM

(71) Applicant: S.A. Armstrong Limited, Scarborough (CA)

(72) Inventor: Marcelo Javier Acosta Gonzalez, Scarborough (CA)

(73) Assignee: S.A. Armstrong Limited, Scarborough, Ontario (CA)

( * ) Notice: Subject to any disclaimer, the term of this patent is extended or adjusted under 35 U.S.C. 154(b) by 178 days.

(21) Appl. No.: 14/441,037

(22) PCT Filed: Nov. 13, 2013

(86) PCT No.: PCT/CA2013/050867
§ 371 (c)(1),
(2) Date: May 6, 2015

(87) PCT Pub. No.: WO2014/089693
PCT Pub. Date: Jun. 19, 2014

(65) Prior Publication Data
US 2015/0286196 A1  Oct. 8, 2015

Related U.S. Application Data

(60) Provisional application No. 61/736,051, filed on Dec. 12, 2012, provisional application No. 61/753,549, filed on Jan. 17, 2013.

(51) Int. Cl.
*G06F 19/00* (2011.01)
*G05B 13/04* (2006.01)
(Continued)

(52) U.S. Cl.
CPC ........... *G05B 13/04* (2013.01); *F04D 15/029* (2013.01); *F04D 15/0209* (2013.01);
(Continued)

(58) Field of Classification Search
USPC .......................................................... 700/19
See application file for complete search history.

(56) References Cited

U.S. PATENT DOCUMENTS 5,522,707 A   6/1996 Potter
5,535,814 A   7/1996 Hartman
(Continued)

FOREIGN PATENT DOCUMENTS

CN   1415915 A   5/2003
CN   101033749 A   9/2007
(Continued)

OTHER PUBLICATIONS

Extended European Search Report for European application No. 13861619.8 dated Oct. 26, 2016, 9 pages.
(Continued)

*Primary Examiner* — Kidest Bahta
(74) *Attorney, Agent, or Firm* — Bret E. Field; Bozicevic, Field & Francis LLP

(57) ABSTRACT

A method and system for co-ordinating control of a plurality of sensorless devices. Each device includes a communication subsystem and configured to self-detect one or more device properties, the device properties resulting in output having one or more output properties. The method includes: detecting inputs including the one or more device properties of each device, correlating, for each device, the detected one or more device properties to the one or more output properties, and co-ordinating control of each of the devices to operate at least one of their respective device properties to co-ordinate one or more output properties for the combined output to achieve a setpoint. In some example embodiments, the setpoint can be fixed, calculated or externally determined.

50 Claims, 8 Drawing Sheets

(51) Int. Cl.
  *F04D 27/00*    (2006.01)
  *G05D 7/06*    (2006.01)
  *F04D 15/02*    (2006.01)
  *G05B 15/02*    (2006.01)
  *G05B 19/042*   (2006.01)

(52) U.S. Cl.
  CPC ........... *F04D 27/00* (2013.01); *G05B 13/041* (2013.01); *G05B 15/02* (2013.01); *G05D 7/0617* (2013.01); *G05D 7/0682* (2013.01); *G05B 19/042* (2013.01)

(56) References Cited

U.S. PATENT DOCUMENTS

| | | |
|---|---|---|
| 5,742,500 A | 4/1998 | Irvin |
| 6,016,656 A | 1/2000 | Sorensen |
| 6,045,332 A | 4/2000 | Lee et al. |
| 6,070,660 A | 6/2000 | Byrnes et al. |
| 6,099,264 A | 8/2000 | Du |
| 6,109,030 A | 8/2000 | Geringer |
| 6,185,946 B1 | 2/2001 | Hartman |
| 6,257,007 B1 | 7/2001 | Hartman |
| 6,257,833 B1 | 7/2001 | Bates |
| 6,354,805 B1 | 3/2002 | Moller |
| 6,394,120 B1 | 5/2002 | Wichert |
| 6,464,464 B2 | 10/2002 | Sabini et al. |
| 6,468,042 B2 | 10/2002 | Moller |
| 6,592,340 B1 | 7/2003 | Horo et al. |
| 6,663,352 B2 | 12/2003 | Sabini et al. |
| 6,913,166 B2 | 7/2005 | Cline et al. |
| 7,010,393 B2 | 3/2006 | Mirsky et al. |
| 7,480,544 B2 | 1/2009 | Wang et al. |
| 7,797,958 B2* | 9/2010 | Alston ............... B60H 1/00428 165/43 |
| 7,857,600 B2* | 12/2010 | Koehl ................ F04D 15/0088 417/44.11 |
| 7,945,411 B2 | 5/2011 | Kerman et al. |
| 8,126,574 B2 | 2/2012 | Discenzo et al. |
| 8,328,523 B2 | 12/2012 | Kernan et al. |
| 8,660,702 B2* | 2/2014 | Raghavachari ........ G05B 15/02 700/276 |
| 8,700,221 B2* | 4/2014 | Cheng ................ F04D 15/0066 165/157 |
| 2002/0136642 A1 | 9/2002 | Moller |
| 2004/0247448 A1 | 12/2004 | Kunkler et al. |
| 2005/0006488 A1 | 1/2005 | Stanimirovic |
| 2005/0123408 A1 | 6/2005 | Koehl |
| 2005/0192680 A1 | 9/2005 | Cascia et al. |
| 2006/0112478 A1 | 6/2006 | Kolar et al. |
| 2006/0230772 A1 | 10/2006 | Wacknov et al. |
| 2006/0272830 A1 | 12/2006 | Fima |
| 2007/0154320 A1* | 7/2007 | Stiles ...................... F04B 49/20 417/43 |
| 2007/0212210 A1* | 9/2007 | Kernan ................. F04D 27/001 415/1 |
| 2008/0110189 A1* | 5/2008 | Alston ............... B60H 1/00428 62/236 |
| 2009/0218968 A1* | 9/2009 | Jeung ..................... H02P 6/085 318/400.04 |
| 2010/0247332 A1* | 9/2010 | Stiles, Jr. ................ F04B 49/20 417/20 |
| 2010/0300540 A1 | 12/2010 | Grosse Westhoff et al. |
| 2010/0306001 A1* | 12/2010 | Discenzo ............. G05B 13/024 705/7.37 |
| 2011/0181431 A1* | 7/2011 | Koehl ................ F04D 15/0088 340/660 |
| 2011/0276180 A1 | 11/2011 | Seem |
| 2012/0078424 A1 | 3/2012 | Raghavachari |
| 2012/0173023 A1 | 7/2012 | Fuxman et al. |
| 2012/0173027 A1 | 7/2012 | Cheng et al. |
| 2012/0271462 A1 | 10/2012 | Dempster et al. |
| 2012/0328453 A1 | 12/2012 | Lisk |

FOREIGN PATENT DOCUMENTS

| | | |
|---|---|---|
| CN | 102301288 A | 12/2011 |
| DE | 19618462 A1 | 11/1997 |
| DE | 102009013756 A1 | 9/2010 |
| EP | 0905596 A2 | 3/1999 |
| EP | 2246569 A2 | 11/2010 |
| EP | 1323986 B1 | 1/2011 |
| EP | 1933097 B1 | 4/2013 |
| GB | 2432015 A | 5/2007 |
| WO | 2005/064167 A1 | 7/2005 |
| WO | 2012/095249 A1 | 7/2012 |

OTHER PUBLICATIONS

Extended European Search Report for European application No. 13863109.8 dated Oct. 25, 2016, 8 pages.
Nelson, Simulation Modeling of a Central Chiller Plant, ASHRAE paper 7547, presented at the 2012 ASHRAE Winter Conference in Chicago.
Kallesoe et al., Adaptive Selection of Control-Curves for Domestic Circulators, undated.
Canada International Searching Authority, International Search Report and Written Opinion in respect of PCT/CA2013/050867, dated Dec. 31, 2013.
IPEA/CA, International Preliminary Report on Patentability in respect of PCT/CA2013/050867, dated Mar. 13, 2015.
Office Action for Chinese application No. 201380065187.7 dated Apr. 6, 2017, 40 pages, including an English translation.
Office Action for Chinese application No. 201380065327.0 dated Apr. 13, 2017, 54 pages, including an English translation.

* cited by examiner

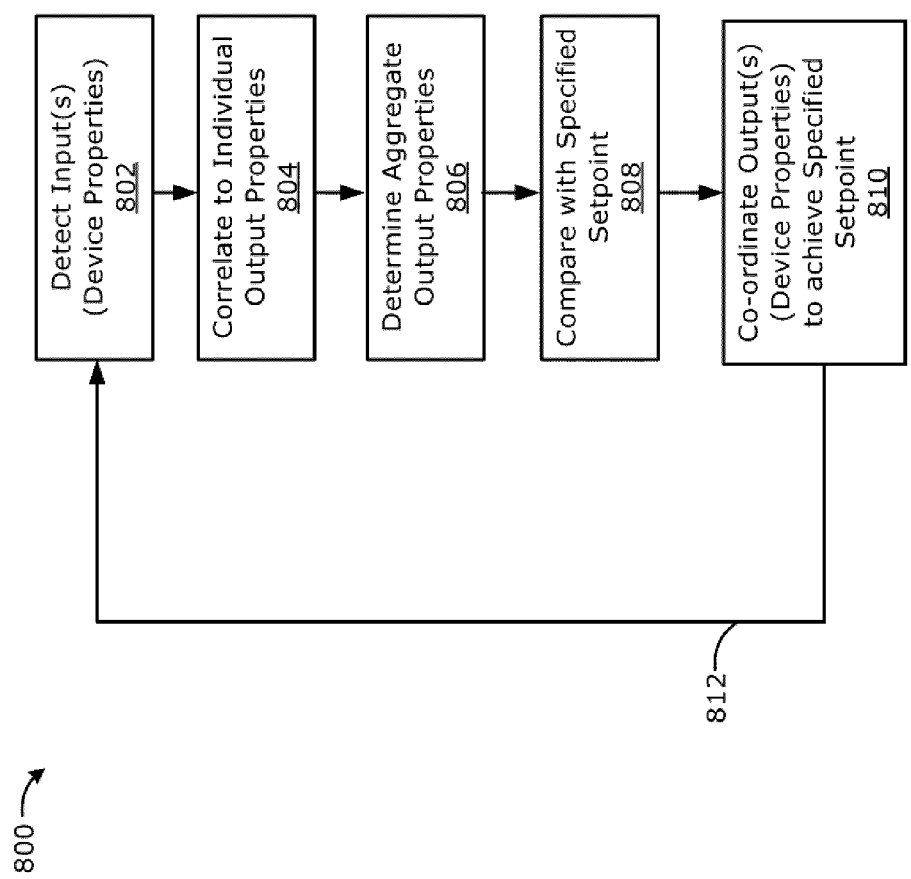

CO-ORDINATED SENSORLESS CONTROL SYSTEM

CROSS-REFERENCE TO RELATED APPLICATIONS

This application claims the benefit of priority to U.S. Provisional Patent Application No. 61/736,051 filed Dec. 12, 2012 entitled "CO-ORDINATED SENSORLESS CONTROL SYSTEM", and to U.S. Provisional Patent Application No. 61/753,549 filed Jan. 17, 2013 entitled "SELF LEARNING CONTROL SYSTEM AND METHOD FOR OPTIMIZING A CONSUMABLE INPUT VARIABLE", all of which are herein incorporated by reference in their entirety.

TECHNICAL FIELD

Some example embodiments relate to control systems, and some example embodiments relate specifically to flow control systems.

BACKGROUND

In pumping systems where the flow demand changes over time there are several conventional procedures to adapt the operation of the pump(s) to satisfy such demand without exceeding the pressure rating of the system, burning seals or creating vibration, and they may also attempt to optimize the energy use.

Traditional systems have used one or several constant speed pumps and attempted to maintain the discharge pressure constant, when the flow demand changed, by changing the number of running pumps and/or by operating pressure reducing, bypass and discharge valves.

One popular system in use today has several pumps; each equipped with an electronic variable speed drive, and operates them to control one or more pressure(s) remotely in the system, measured by remote sensors (usually installed at the furthest location served or ⅔ down the line). At the remote sensor location(s) a minimum pressure has to be maintained, so the deviation of the measured pressure(s) with respect to the target(s) is calculated. The speed of the running pumps is then adjusted (up or down) to the lowest that maintains all the measured pressures at or above their targets. When the speed of the running pumps exceeds a certain value (usually 95% of the maximum speed), another pump is started. When the speed falls below a certain value (50% or higher, and sometimes dependent on the number of pumps running), a pump is stopped. This sequencing method is designed to minimize the number of pumps used to provide the required amount of flow.

An alternative to this type of system measures the flow and pressure at the pump(s) and estimates the remote pressure by calculating the pressure drop in the pipes in between. The pump(s) are then controlled as per the procedure described above, but using the estimated remote pressure instead of direct measurements. This alternative saves the cost of the remote sensor(s), plus their wiring and installation, but requires a local pressure sensor and flow meter.

One type of pump device estimates the local flow and/or pressure from the electrical variables provided by the electronic variable speed drive. This technology is typically referred to in the art as "sensorless pumps" or "observable pumps". Example implementations using a single pump are described in WO 2005/064167, U.S. Pat. No. 7,945,411, U.S. Pat. No. 6,592,340 and DE19618462. The single device can then be controlled, but using the estimated local pressure and flow to then infer the remote pressure, instead of direct fluid measurements. This method saves the cost of sensors and their wiring and installation, however, these references may be limited to the use of a single pump.

Another such application, where multiple pumps are coordinated to each primarily satisfy a specific corresponding load for each pump, is described in U.S. 2010/0300540.

Additional difficulties with existing systems may be appreciated in view of the description below.

SUMMARY

In accordance with some aspects, there is provided a co-ordinated sensorless flow control system for circulating devices such as pumps, boosters and fans, centrifugal machines, and related systems. The system includes a plurality of sensorless pumps which operate in a co-ordinated manner to achieve a setpoint. For example, the sensorless pumps may be in a parallel configuration, to serve a desired system load. The pressure setpoint can be common to all of the circulating devices, typically determinable for a specific location which is sourced by all of the circulating devices.

In one aspect, there is provided a control system for sourcing a load, including: a plurality sensorless circulating devices each including a respective circulating operable element arranged to source the load, each device configured to self-detect power and speed of the respective device; and one or more controllers configured to: correlate, for each device, the detected power and speed to one or more output properties including pressure and flow, and co-ordinate control of each of the devices to operate at least the respective circulating operable element to co-ordinate one or more output properties for the combined output to achieve a pressure setpoint at the load.

In one aspect, there is provided a control system, including: two or more devices, each device having a communication subsystem and configured to self-detect one or more device properties, the device properties resulting in output having one or more output properties; and one or more controllers configured to: detect inputs including the one or more device properties of each device, correlate, for each device, the detected one or more device properties to the one or more output properties, and co-ordinate control of each of the devices to operate at least one of their respective device properties to co-ordinate one or more output properties for the combined output to achieve a setpoint.

In some example embodiments, the setpoint can be fixed, calculated or externally determined.

In another aspect, there is provided a method for co-ordinating control of two or more devices, each device having a communication subsystem and configured to self-detect one or more device properties, the device properties resulting in output having one or more output properties, the method including: detecting inputs including the one or more device properties of each device; correlating, for each device, the detected one or more device properties to the one or more output properties; and co-ordinating control of each of the devices to operate at least one of their respective device properties to co-ordinate one or more output properties for the combined output to achieve a setpoint.

In another aspect, there is provided a non-transitory computer readable medium having instructions stored thereon executable by one or more processors for co-ordinating control of two or more devices, each device having a communication subsystem and configured to self-detect one or more device properties, the device properties resulting in output having one or more output properties, the instructions including: instructions for detecting inputs including the one or more device properties of each device; instructions for correlating, for each device, the detected one or more device properties to the one or more output properties; and instructions for co-ordinating control of each of the devices to operate at least one of their respective device properties to co-ordinate one or more output properties for the combined output to achieve a setpoint.

In another aspect, there is provided a device for co-ordinating with one or more other devices, each of the one or more other devices configured to self-detect one or more device properties, the device properties resulting in output having one or more output properties. The device includes: a detector configured to self-detect one or more device properties; the device properties resulting in output having one or more output properties; memory for storing a correlation between the one or more device properties and the one or more output properties; a controller configured to correlate, for the device, the detected one or more device properties to the one or more output properties; a communication subsystem for receiving the detected one or more device properties or correlated one or more output properties of the one or more other devices, and for sending instructions to the one or more other devices to co-ordinate control of each of the devices to operate at least one of their respective device properties to co-ordinated one or more output properties of the devices for the combined output to achieve a setpoint; and an output subsystem for controlling the at least one of device properties of the device to achieve the setpoint.

In another aspect, there is provided a device for co-ordinating with one or more other devices, each of the one or more other devices configured to self-detect one or more device properties, the device properties resulting in output having one or more output properties. The device includes: a controller; a detector configured to self-detect one or more device properties, the device properties resulting in output having one or more output properties; memory for storing a correlation between the one or more device properties and the one or more output properties; a communication subsystem for sending the detected one or more device properties or the correlated one or more output properties of the device and for receiving instructions to operate at least one of the device properties of the device to co-ordinate one or more output properties of the devices for the combined output to achieve a setpoint; and an output subsystem for controlling the at least one of the device properties of the device in response to said instructions.

BRIEF DESCRIPTION OF THE DRAWINGS

Embodiments will now be described, by way of example only, with reference to the attached Figures, wherein:

FIG. 8 illustrates a flow diagram of an example method for co-ordinating control of devices, in accordance with an example embodiment.

Like reference numerals may be used throughout the Figures to denote similar elements and features.

DETAILED DESCRIPTION OF EXAMPLE EMBODIMENTS

In some example embodiments, there is provided a control system for an operable system such as a flow control system or temperature control system. Example embodiments relate to "processes" in the industrial sense, meaning a process that outputs product(s) (e.g. hot water, air) using inputs (e.g. cold water, fuel, air, etc.).

It would be advantageous to provide a system which controls operation of a plurality of sensorless pumps in a co-ordinated manner.

At least some example embodiments generally provide a co-ordinated sensorless automated control system for circulating devices such as pumps, boosters and fans, centrifugal machines, and related systems. For example, in some embodiments the system may be configured to operate without external sensors to collectively control output properties to a load.

In one example embodiment, there is provided a control system for sourcing a load, including: a plurality of sensorless circulating devices each including a respective circulating operable element arranged to source the load, each device configured to self-detect power and speed of the respective device; and one or more controllers configured to: correlate, for each device, the detected power and speed to one or more output properties including pressure and flow, and co-ordinate control of each of the devices to operate at least the respective circulating operable element to co-ordinate one or more output properties for the combined output to achieve a pressure setpoint at the load.

Figure 1:
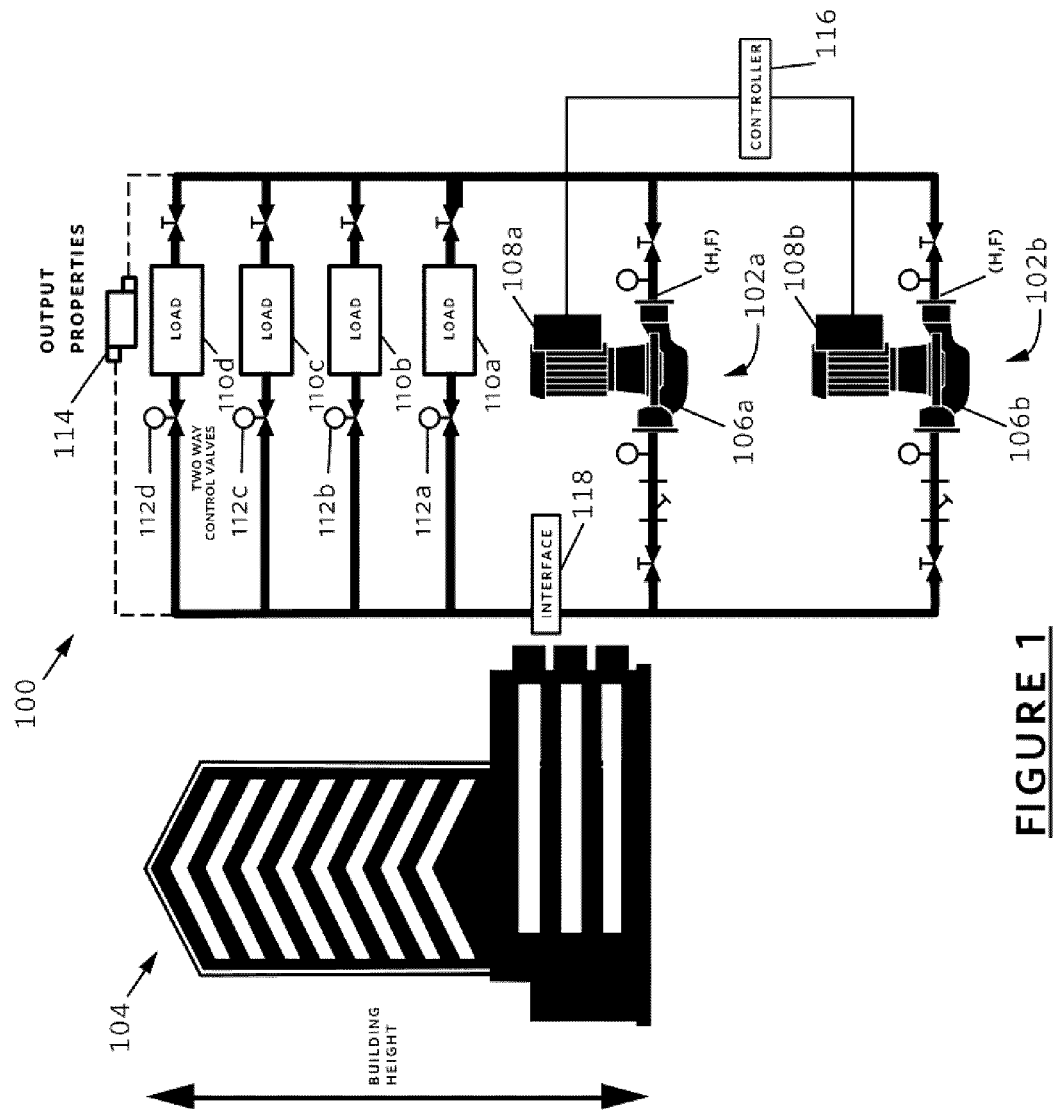
FIG. 1 illustrates an example block diagram of a circulating system having intelligent variable speed control pumps, to which example embodiments may be applied.

Reference is first made to FIG. 1 which shows in block diagram form a circulating system 100 having intelligent variable speed circulating devices such as control pumps 102a, 102b (each or individually referred to as 102), to which example embodiments may be applied. The circulating system 100 may relate to a building 104 (as shown), a campus (multiple buildings), vehicle, or other suitable infrastructure or load. Each control pump 102 may include one or more respective pump devices 106a, 106b (each or individually referred to as 106) and a control device 108a, 108b (each or individually referred to as 108) for controlling operation of each pump device 106. The particular circulating medium may vary depending on the particular application, and may for example include glycol, water, air, and the like.

As illustrated in FIG. 1, the circulating system 100 may include one or more loads 110a, 110b, 110c, 110d, wherein each load may be a varying usage requirement based on HVAC, plumbing, etc. Each 2-way valve 112a, 112b, 112c, 112d may be used to manage the flow rate to each respective load 110a, 110b, 110c, 110d. As the differential pressure across the load decreases, the control device 108 responds to this change by increasing the pump speed of the pump device 106 to maintain or achieve the pressure setpoint. If the differential pressure across the load increases, the control device 108 responds to this change by decreasing the pump speed of the pump device 106 to maintain or achieve the pressure setpoint. In some example embodiments, the control valves 112*a*, 112*b*, 112*c*, 112*d* can include faucets or taps for controlling flow to plumbing systems. In some example embodiments, the pressure setpoint can be fixed, continually or periodically calculated, externally determined, or otherwise specified.

The control device 108 for each control pump 102 may include an internal detector or sensor, typically referred to in the art as a "sensorless" control pump because an external sensor is not required. The internal detector may be configured to self-detect, for example, device properties such as the power and speed of the pump device 106. Other input variables may be detected. The pump speed of the pump device 106 may be varied to achieve a pressure and flow setpoint of the pump device 106 in dependence of the internal detector. A program map may be used by the control device 108 to map a detected power and speed to resultant output properties, such as head output and flow output (H, F).

Referring still to FIG. 1, the output properties of each control device 102 are controlled to, for example, achieve a pressure setpoint at the combined output properties 114, shown at a load point of the building 104. The output properties 114 represent the aggregate or total of the individual output properties of all of the control pumps 102 at the load, in this case, flow and pressure. In typical conventional systems, an external sensor (not shown) would be placed at the location of the output properties 114 and associated controls (not shown) would be used to control or vary the pump speed of the pump device 106 to achieve a pressure setpoint in dependence of the detected flow by the external sensor. In contrast, in example embodiments the output properties 114 are instead inferred or correlated from the self-detected device properties, such as the power and speed of the pump devices 106, and/or other input variables. As shown, the output properties 114 are located at the most extreme load position at the height of the building 104 (or end of the line), and in other example embodiments may be located in other positions such as the middle of the building 104, ⅔ from the top of the building 104 or down the line, or at the farthest building of a campus.

One or more controllers 116 (e.g. processors) may be used to co-ordinate the output flow of the control pumps 102. As shown, the control pumps 102 may be arranged in parallel with respect to the shared loads 110*a*, 110*b*, 110*c*, 110*d*. For example, the individual output properties of each of the control pumps 102 can be inferred and controlled by the controller 116 so as to achieve the aggregate output properties 114. This feature is described in greater detail below.

In some examples, the circulating system 100 may be a chilled circulating system ("chiller plant"). The chiller plant may include an interface 118 in thermal communication with a secondary circulating system for the building 104. The control valves 112*a*, 112*b*, 112*c*, 112*d* manage the flow rate to the cooling coils (e.g., load 110*a*, 110*b*, 110*c*, 110*d*). Each 2-way valve 112*a*, 112*b*, 112*c*, 112*d* may be used to manage the flow rate to each respective load 110*a*, 110*b*, 110*c*, 110*d*. As a valve 112*a*, 112*b*, 112*c*, 112*d* opens, the differential pressure across the valve decreases. The control device 108 responds to this change by increasing the pump speed of the pump device 106 to achieve a specified output setpoint. If a control valve 112*a*, 112*b*, 112*c*, 112*d* closes, the differential pressure across the valve increases, and the control devices 108 respond to this change by decreasing the pump speed of the pump device 106 to achieve a specified output setpoint.

In some other examples, the circulating system 100 may be a heating circulating system ("heating plant"). The heater plant may include an interface 118 in thermal communication with a secondary circulating system for the building 104. In such examples, the control valves 112*a*, 112*b*, 112*c*, 112*d* manage the flow rate to heating elements (e.g., load 110*a*, 110*b*, 110*c*, 110*d*). The control devices 108 respond to changes in the heating elements by increasing or decreasing the pump speed of the pump device 106 to achieve the specified output setpoint.

Referring still to FIG. 1, the pump device 106 may take on various forms of pumps which have variable speed control. In some example embodiments, the pump device 106 includes at least a sealed casing which houses the pump device 106, which at least defines an input element for receiving a circulating medium and an output element for outputting the circulating medium. The pump device 106 includes one or more operable elements, including a variable motor which can be variably controlled from the control device 108 to rotate at variable speeds. The pump device 106 also includes an impeller which is operably coupled to the motor and spins based on the speed of the motor, to circulate the circulating medium. The pump device 106 may further include additional suitable operable elements or features, depending on the type of pump device 106. Device properties of the pump device 106, including the motor speed and power, may be self-detected by the control device 108.

Figure 2:
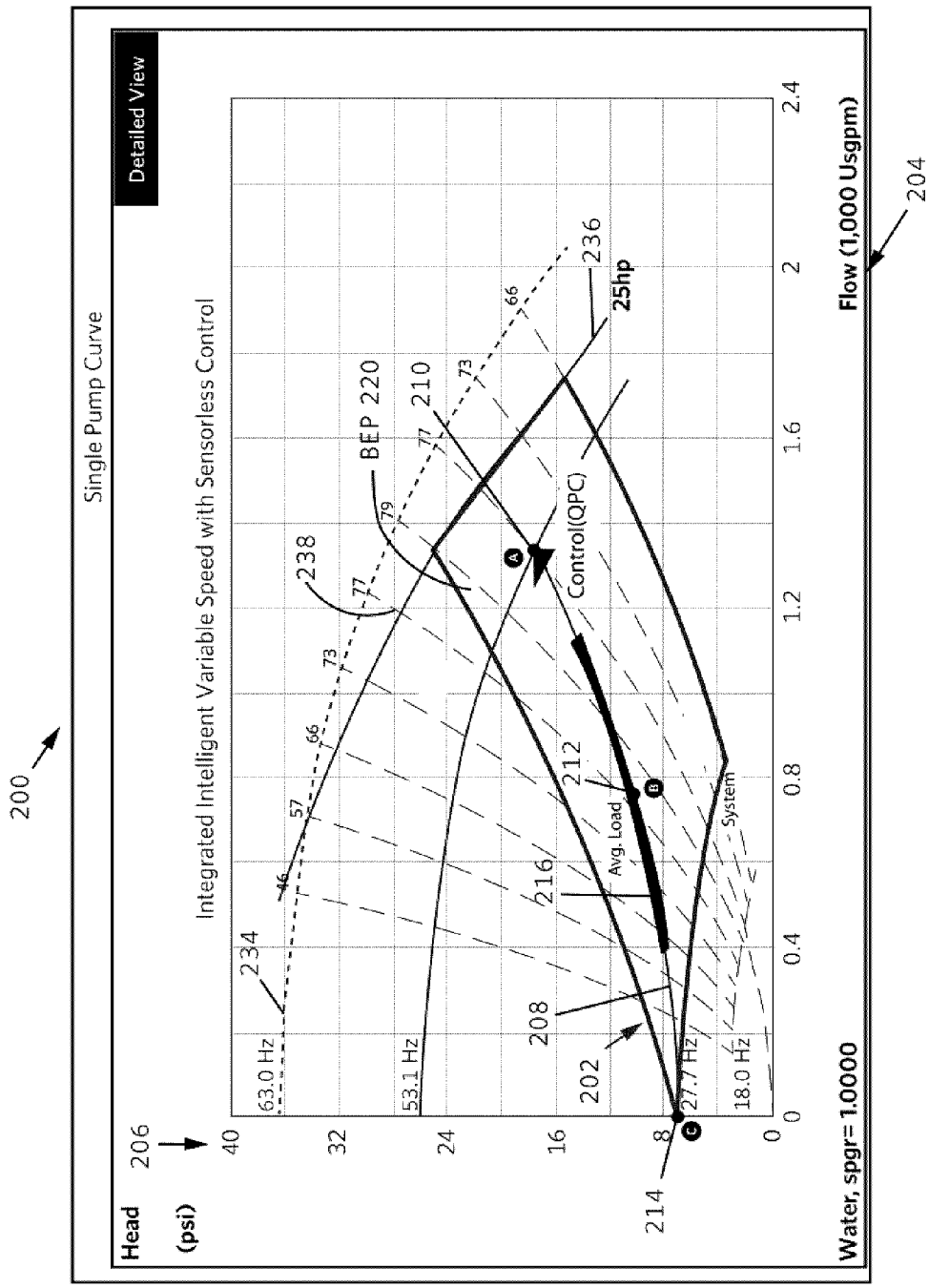
FIG. 2 illustrates an example range of operation of a variable speed control pump.

Reference is now made to FIG. 2, which illustrates a graph 200 showing an example suitable range of operation 202 for a variable speed device, in this example the control pump 102. The range of operation 202 is illustrated as a polygon-shaped region or area on the graph 200, wherein the region is bounded by a border represents a suitable range of operation. For example, a design point may be, e.g., a maximum expected system load as in point A (210) as required by a system such as a building 104 at the output properties 114 (FIG. 1).

The design point, Point A (210), can be estimated by the system designer based on the flow that will be required by a system for effective operation and the head/pressure loss required to pump the design flow through the system piping and fittings. Note that, as pump head estimates may be over-estimated, most systems will never reach the design pressure and will exceed the design flow and power. Other systems, where designers have under-estimated the required head, will operate at a higher pressure than the design point. For such a circumstance, one feature of properly selecting one or more intelligent variable speed pumps is that it can be properly adjusted to delivery more flow and head in the system than the designer specified.

The design point can also be estimated for operation with multiple controlled pumps 102, with the resulting flow requirements allocated between the controlled pumps 102. For example, for controlled pumps of equivalent type or performance, the total estimated required output properties 114 (e.g. the maximum flow to maintain a required pressure design point at that location of the load) of a system or building 104 may be divided equally between each controlled pump 102 to determine the individual design points, and to account for losses or any non-linear combined flow output. In other example embodiments, the total output properties (e.g. at least flow) may be divided unequally, depending on the particular flow capacities of each control pump 102, and to account for losses or any non-linear combined flow output. The individual design setpoint, as in point A (210), is thus determined for each individual control pump 102.

The graph 200 includes axes which include parameters which are correlated. For example, head squared is approximately proportional to flow, and flow is approximately proportional to speed. In the example shown, the abscissa or x-axis 204 illustrates flow in U.S. gallons per minute (GPM) and the ordinate or y-axis 206 illustrates head (H) in pounds per square inch (psi) (alternatively in feet). The range of operation 202 is a superimposed representation of the control pump 102 with respect to those parameters, onto the graph 200.

The relationship between parameters may be approximated by particular affinity laws, which may be affected by volume, pressure, and Brake Horsepower (BHP). For example, for variations in impeller diameter, at constant speed: $D1/D2=Q1/Q2$; $H1/H2=D1^2/D2^2$; $BHP1/BHP2=D1^3/D2^3$. For example, for variations in speed, with constant impeller diameter: $S1/S2=Q1/Q2$; $H1/H2=S1^2/S2^2$; $BHP1/BHP2=S1^3/S2^3$. Wherein: D=Impeller Diameter (Ins/mm); H=Pump Head (Ft/m); Q=Pump Capacity (gpm/lps); S=Speed (rpm/rps); BHP=Brake Horsepower (Shaft Power–hp/kW).

Specifically, for the graph 200 at least some of the parameters there is more than one operation point or path of system variables of the operable system that can provide a given output setpoint. As is understood in the art, at least one system variable at an operation point or path restricts operation of another system variable at the operation point or path.

Also illustrated is a best efficiency point (BEP) curve 220 of the control pump 102. The partial efficiency curves are also illustrated, for example the 77% efficiency curve 238. In some example embodiments, an upper boundary of the range of operation 202 may also be further defined by a motor power curve 236 (e.g. maximum horsepower). In alternate embodiments, the boundary of the range of operation 202 may also be dependent on a pump speed curve 234 (shown in Hz) rather than a strict maximum motor power curve 236.

As shown in FIG. 2, one or more control curves 208 (one shown) may be defined and programmed for an intelligent variable speed device, such as the control pump 102. Depending on changes to the detected parameters (e.g. internal or inferred detection of changes in flow/load), the operation of the pump device 106 may be maintained to operate on the control curve 208 based on instructions from the control device 108 (e.g. at a higher or lower flow point). This mode of control may also be referred to as quadratic pressure control (QPC), as the control curve 208 is a quadratic curve between two operating points (e.g., point A (210): maximum head, and point C (214): minimum head). Reference to "intelligent" devices herein includes the control pump 102 being able to self-adjust operation of the pump device 106 along the control curve 208, depending on the particular required or detected load.

Other example control curves other than quadratic curves include constant pressure control and proportional pressure control (sometimes referred to as straight-line control). Selection may also be made to another specified control curve (not shown), which may be either pre-determined or calculated in real-time, depending on the particular application.

Figure 3:
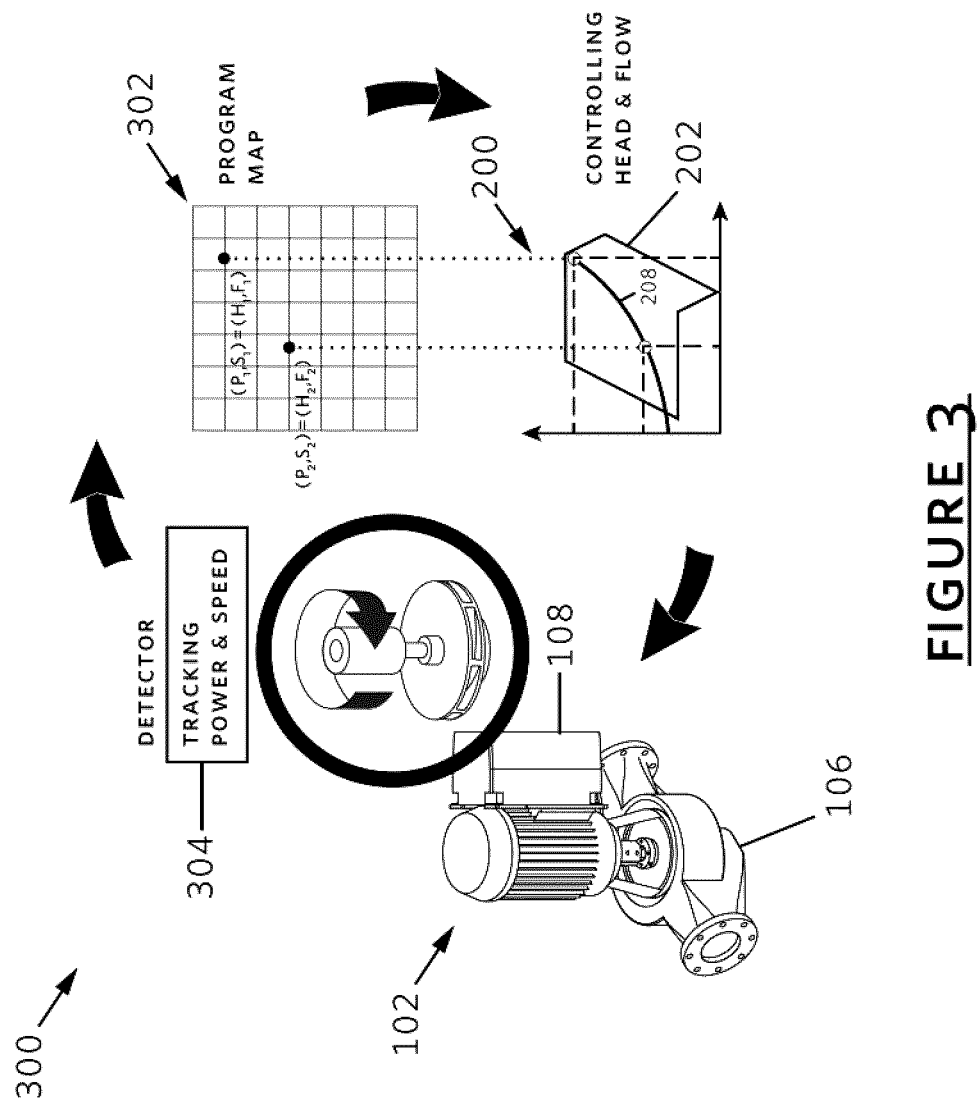
FIG. 3 shows a diagram illustrating internal sensing control of a variable speed control pump.

Reference is now made to FIG. 3, which shows a diagram 300 illustrating internal sensing control (sometimes referred to as "sensorless" control) of the control pump 102 within the range of operation 202, in accordance with example embodiments. For example, an external or proximate sensor would not be required in such example embodiments. An internal detector 304 or sensor may be used to self-detect device properties such as an amount of power and speed (P, S) of an associated motor of the pump device 106. A program map 302 stored in a memory of the control device 108 is used by the control device 108 to map or correlate the detected power and speed (P, S), to resultant output properties, such as head and flow (H, F) of the device 102, for a particular system or building 104. During operation, the control device 108 monitors the power and speed of the pump device 106 using the internal detector 304 and establishes the associated head-flow condition relative to the system requirements. The associated head-flow (H, F) condition of the device 102 can be used to calculate the individual contribution of the device 102 to the total output properties 114 (FIG. 1) at the load. The program map 302 can be used to map the power and speed to control operation of the pump device 106 onto the control curve 208, wherein a point on the control curve is used as the desired device setpoint. For example, referring to FIG. 1, as control valves 112a, 112b, 112c, 112d open or close to regulate flow to the cooling coils (e.g. load 110a, 110b, 110c, 110d), the control device 108 automatically adjusts the pump speed to match the required system pressure requirement at the current flow.

Note that the internal detector 304 for self-detecting device properties contrasts with some conventional existing systems which may use a local pressure sensor and flow meter which merely directly measures the pressure and flow across the control pump 102. Such variables (local pressure sensor and flow meter) may not be considered device properties, in example embodiments.

Another example embodiment of a variable speed sensorless device is a compressor which estimates refrigerant flow and lift from the electrical variables provided by the electronic variable speed drive. In an example embodiment, a "sensorless" control system may be used for one or more cooling devices in a controlled system, for example as part of a "chiller plant" or other cooling system. For example, the variable speed device may be a cooling device including a controllable variable speed compressor. In some example embodiments, the self-detecting device properties of the cooling device may include, for example, power and/or speed of the compressor. The resultant output properties may include, for example, variables such as temperature, humidity, flow, lift and/or pressure.

Another example embodiment of a variable speed sensorless device is a fan which estimates air flow and the pressure it produces from the electrical variables provided by the electronic variable speed drive.

Another example embodiment of a sensorless device is a belt conveyor which estimates its speed and the mass it carries from the electrical variables provided by the electronic variable speed drive.

Figure 4:
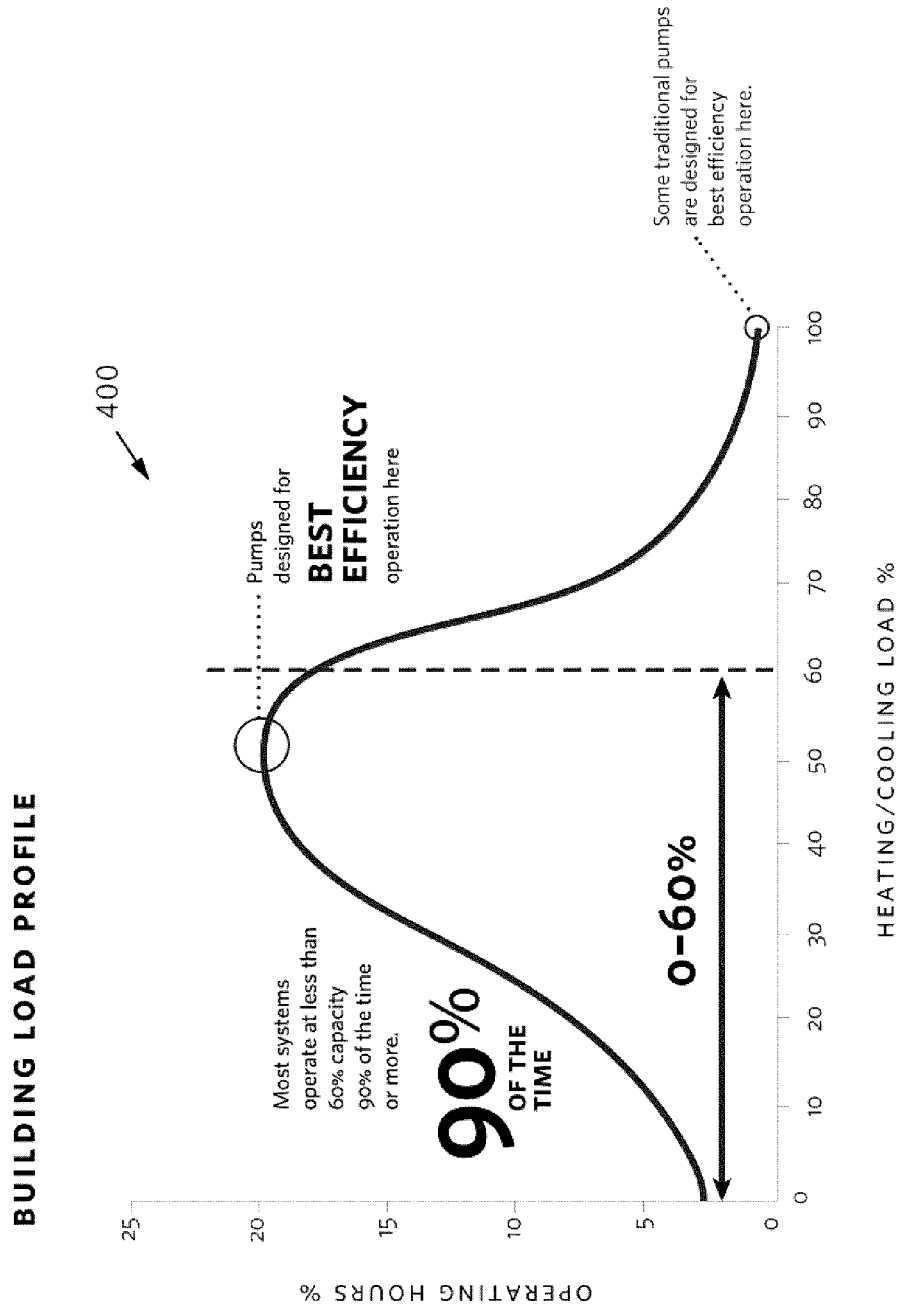
FIG. 4 illustrates an example load profile for a system such as a building.

FIG. 4 illustrates an example load profile 400 for a system such as a building 104, for example, for a projected or measured "design day". The load profile 400 illustrates the operating hours percentage versus the heating/cooling load percentage. For example, as shown, many example systems may require operation at only 0% to 60% load capacity 90% of the time or more. In some examples, a control pump 102 may be selected for best efficiency operation at partial load, for example on or about 50% of peak load. Note that, ASHRAE 90.1 standard for energy savings requires control of devices that will result in pump motor demand of no more than 30% of design wattage at 50% of design water flow (e.g. 70% energy savings at 50% of peak load). It is understand that the "design day" may not be limited to 24 hours, but can be determined for shorter or long system periods, such as one month, one year, or multiple years.

Referring again to FIG. 2, various points on the control curve 208 may be selected or identified or calculated based on the load profile 400 (FIG. 4), shown as point A (210), point B (212), and point C (214). For example, the points of the control curve 208 may be optimized for partial load rather than 100% load. For example, referring to point B (212), at 50% flow the efficiency conforms to ASHRAE 90.1 (greater than 70% energy savings). Point B (212) can be referred to as an optimal setpoint on the control curve 208, which has maximized efficiency on the control curve 208 for 50% load or the most frequent partial load. Point A (210) represents a design point which can be used for selection purposes for a particular system, and may represent a maximum expected load requirement of a given system. Note that, in some example embodiments, there may be actually increased efficiency at part load for point B versus point A. Point C (214) represents a minimum flow and head (Hmin), based on 40% of the full design head, as a default, for example. Other examples may use a different value, depending on the system requirements. The control curve 208 may also include an illustrated thicker portion 216 which represents a typical expected load range (e.g. on or about 90%-95% of a projected load range for a projected design day). Accordingly, the range of operation 202 may be optimized for partial load operation. In some example embodiments, the control curve 208 may be re-calculated or redefined based on changes to the load profile 400 (FIG. 4) of the system, either automatically or manually. The curve thicker portion 216 may also change with the control curve 208 based on changes to the load profile 400 (FIG. 4).

Figure 5:
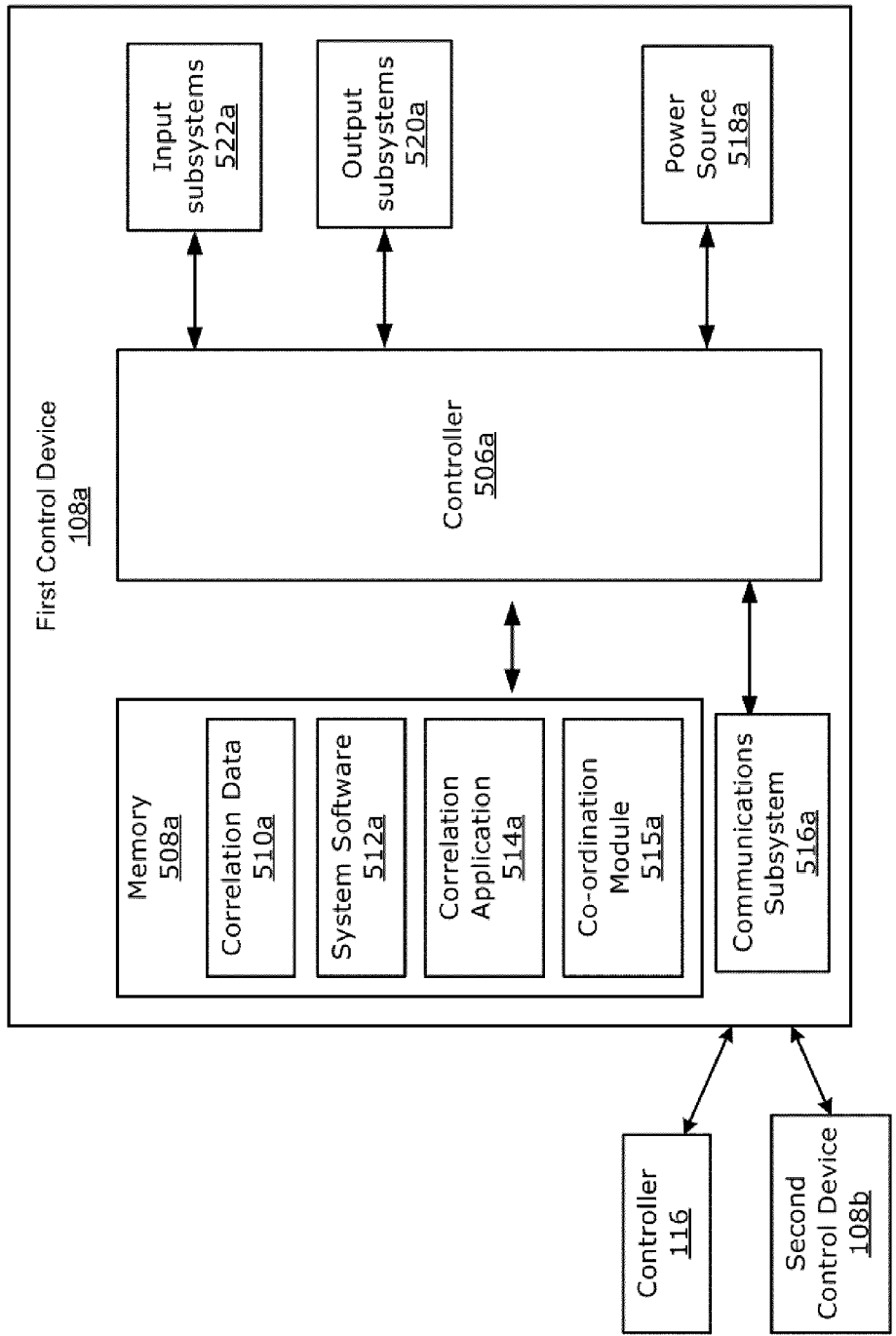
FIG. 5 illustrates an example detailed block diagram of a control device, in accordance with an example embodiment.

FIG. 5 illustrates an example detailed block diagram of the first control device 108a, for controlling the first control pump 102a (FIG. 1), in accordance with an example embodiment. The first control device 108a may include one or more controllers 506a such as a processor or microprocessor, which controls the overall operation of the control pump 102a. The control device 108a may communicate with other external controllers 116 or other control devices (one shown, referred to as second control device 108b) to co-ordinate the controlled aggregate output properties 114 of the control pumps 102 (FIG. 1). The controller 506a interacts with other device components such as memory 508a, system software 512a stored in the memory 508a for executing applications, input subsystems 522a, output subsystems 520a, and a communications subsystem 516a. A power source 518a powers the control device 108a. The second control device 108b may have the same, more, or less, blocks or modules as the first control device 108a, as appropriate. The second control device 108b is associated with a second device such as second control pump 102b (FIG. 1).

The communications subsystem 516a is configured to communicate with, either directly or indirectly, the other controller 116 and/or the second control device 108b. The communications subsystem 516a may further be configured for wireless communication. The communications subsystem 516a may be configured to communicate over a network such as a Local Area Network (LAN), wireless (Wi-Fi) network, and/or the Internet. These communications can be used to co-ordinate the operation of the control pumps 102 (FIG. 1).

The input subsystems 522a can receive input variables. Input variables can include, for example, the detector 304 (FIG. 3) for detecting device properties such as power and speed (P, S) of the motor. Other example inputs may also be used. The output subsystems 520a can control output variables, for example one or more operable elements of the control pump 102a. For example, the output subsystems 520a may be configured to control at least the speed of the motor of the control pump 102a in order to achieve a resultant desired output setpoint for head and flow (H, F), for example to operate the control pump 102 onto the control curve 208 (FIG. 2). Other example outputs variables, operable elements, and device properties may also be controlled.

In some example embodiments, the control device 108a may store data in the memory 508a, such as correlation data 510a. The correlation data 510a may include correlation information, for example, to correlate or infer between the input variables and the resultant output properties. The correlation data 510a may include, for example, the program map 302 (FIG. 3) which can map the power and speed to the resultant flow and head at the pump 102, resulting in the desired pressure setpoint at the load output. In other example embodiments, the correlation data 510a may be in the form of a table, model, equation, calculation, inference algorithm, or other suitable forms.

The memory 508a may also store other data, such as the load profile 400 (FIG. 4) for the measured "design day" or average annual load. The memory 508a may also store other information pertinent to the system or building 104 (FIG. 1).

In some example embodiments, the correlation data 510a stores the correlation information for some or all of the other devices 102, such as the second control pump 102b (FIG. 1).

Referring still to FIG. 5, the control device 108a includes one or more program applications. In some example embodiments, the control device 108a includes a correlation application 514a or inference application, which receives the input variables (e.g. power and speed) and determines or infers, based from the correlation data 510a, the resultant output properties (e.g. flow and head) at the pump 102a. In some example embodiments, the control device 108a includes a co-ordination module 515a, which can be configured to receive the determined individual output properties from the second control device 108b, and configured to logically co-ordinate each of the control devices 108a, 108b, and provide commands or instructions to control each of the output subsystems 520a, 520b and resultant output properties in a co-ordinated manner, to achieve a specified output setpoint of the output properties 114.

In some example embodiments, some or all of the correlation application 514a and/or the co-ordination module 515a may alternatively be part of the external controller 116.

In some example embodiments, in an example mode of operation, the control device 108a is configured to receive the input variables from its input subsystem 522a, and send such information as detection data (e.g. uncorrelated measured data) over the communications subsystem 516a to the other controller 116 or to the second control device 108b, for off-device processing which then correlates the detection data to the corresponding output properties. The off-device processing may also determine the aggregate output properties of all of the control devices 108a, 108b, for example to output properties 114 of a common load. The control device 108a may then receive instructions or commands through the communications subsystem 516a on how to control the output subsystems 520a, for example to control the local device properties or operable elements.

In some example embodiments, in another example mode of operation, the control device 108a is configured to receive input variables of the second control device 108b, either from the second control device 108b or the other controller 116, as detection data (e.g. uncorrelated measured data) through the communications system 516a. The control device 108a may also self-detect its own input variables from the input subsystem 522a. The correlation application 514a may then be used to correlate the detection data of all of the control devices 108a, 108b to their corresponding output properties. In some example embodiments, the co-ordination module 515a may determine the aggregate output properties for all of the control devices 108a, 108b, for example to the output properties 114 of a common load. The control device 108a may then send instructions or commands through the communications subsystem 516a to the other controller 116 or the second control device 108b, on how the second control device 108b is to control its output subsystems, for example to control its particular local device properties. The control device 108a may also control its own output subsystems 520a, for example to control its own device properties to the first control pump 102a (FIG. 1).

In some other example embodiments, the control device 108a first maps the detection data to the output properties and sends the data as correlated data (e.g. inferred data). Similarly, the control device 108a can be configured to receive data as correlated data (e.g. inferred data), which has been mapped to the output properties by the second control device 108b, rather than merely receiving the detection data. The correlated data may then be co-ordinated to control each of the control devices 108a, 108b.

Referring again to FIG. 1, the speed of each of the control pumps 102 can be controlled to achieve or maintain the inferred remote pressure constant by achieving or maintaining $H=H1+(HD-H1)*(Q/QD)^2$ (hereinafter Equation 1), wherein H is the inferred local pressure, H1 is the remote pressure setpoint, HD is the local pressure at design conditions, Q is the inferred total flow and QD is the total flow at design conditions. In example embodiments, the number of pumps running (N) is increased when $H<HD*(Q/QD)^2*(N+0.5+k)$ (hereinafter Equation 2), and decreased if $H>HD*(Q/QD)^2*(N-0.5-k2)$ (hereinafter Equation 3), where k and k2 constants to ensure a deadband around the sequencing threshold.

Reference is now made to FIG. 8, which illustrates a flow diagram of an example method 800 for co-ordinating control of two or more control devices, in accordance with an example embodiment. The devices each include a communication subsystem and are configured to self-detect one or more device properties, the device properties resulting in output having one or more output properties. At event 802, the method 800 includes detecting inputs including the one or more device properties of each device. At event 804, the method 800 includes correlating, for each device, the detected one or more device properties to the one or more output properties, at each respective device. The respective one or more output properties can then be calculated to determine their individual contributions to a system load point. At event 806, the method 800 includes determining the aggregate output properties to the load from the individual one or more output properties. At event 808, the method 800 includes comparing the determined aggregate output properties 114 with a setpoint, such as a pressure setpoint at the load. For example, it may be determined that one or more of the determined aggregate output properties are greater than, less than, or properly maintained at the setpoint. For example, this control may be performed using Equation 1, as detailed above. At event 810, the method includes co-ordinating control of each of the devices to operate the respective one or more device properties to co-ordinate the respective one or more output properties to achieve the setpoint. This may include increasing, decreasing, or maintaining the respective one or more device properties in response, for example to a point on the control curve 208 (FIG. 2). The method 800 may be repeated, for example, as indicated by the feedback loop 812. The method 800 can be automated in that manual control would not be required.

In another example embodiment, the method 800 may include a decision to turn on or turn off one or more of the control pumps 102, based on predetermined criteria. For example, the decision may be made using Equation 2 and Equation 3, as detailed above.

While the method 800 illustrated in FIG. 8 is represented as a feedback loop 812, in some other example embodiments each event may represent state-based operations or modules, rather than a chronological flow.

For example, referring to FIG. 1, the various events of the method 800 of FIG. 8 may be performed by the first control device 108a, the second control device 108b, and/or the external controller 116, either alone or in combination.

Figure 6:
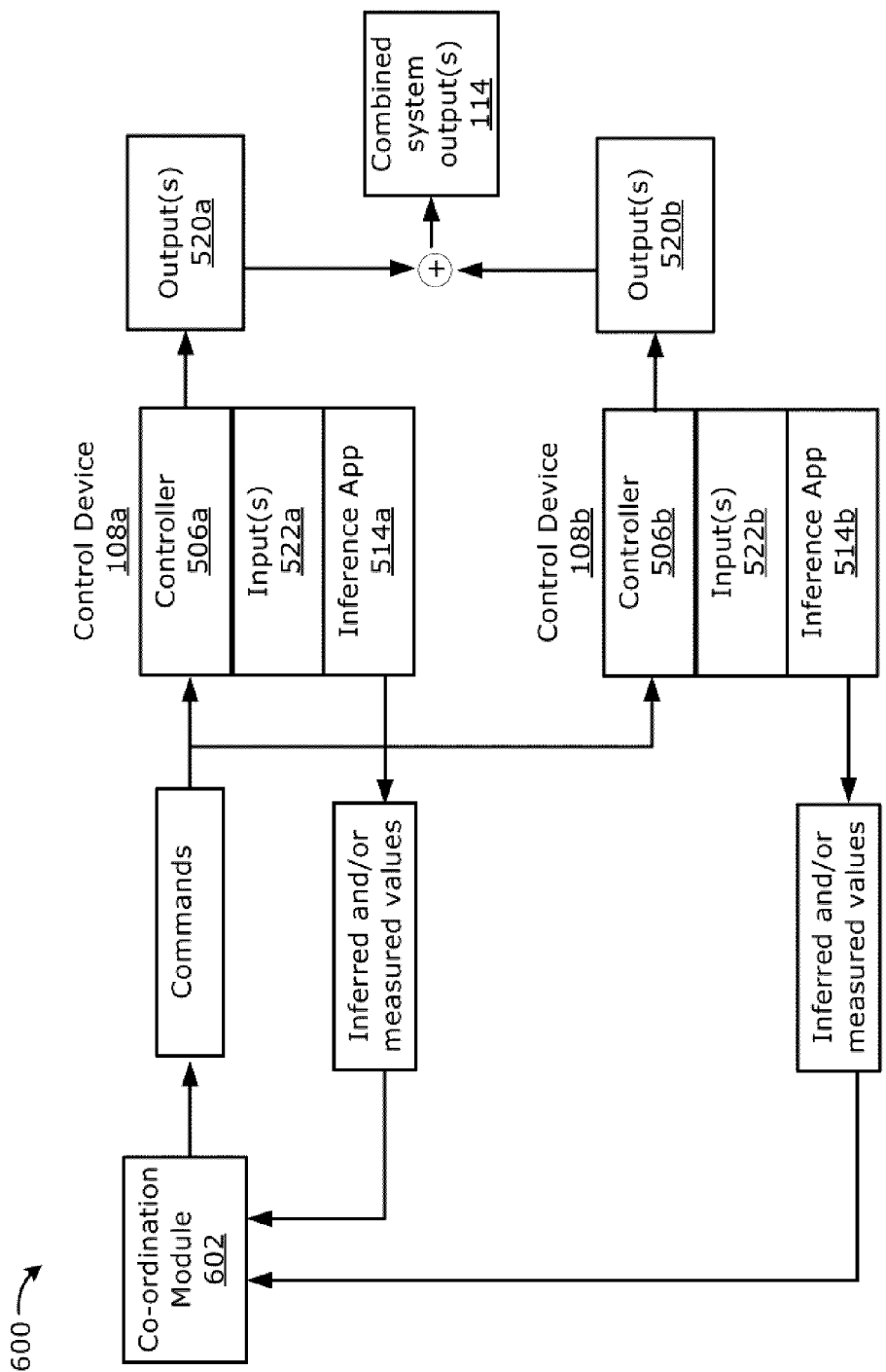
FIG. 6 illustrates a control system for co-ordinating control of devices, in accordance with an example embodiment.

Reference is now made to FIG. 6, which illustrates an example embodiment of a control system 600 for co-ordinating two or more sensorless control devices (two shown), illustrated as first control device 108a and second control device 108b. Similar reference numbers are used for convenience of reference. As shown, each control device 108a, 108b may each respectively include the controller 506a, 506b, the input subsystem 522a, 522b, and the output subsystem 520a, 520b for example to control at least one or more operable device members (not shown).

A co-ordination module 602 is shown, which may either be part of at least one of the control devices 108a, 108b, or a separate external device such as the controller 116 (FIG. 1). Similarly, the inference application 514a, 514b may either be part of at least one of the control devices 108a, 108b, or part of a separate device such as the controller 116 (FIG. 1).

In operation, the co-ordination module 602 co-ordinates the control devices 108a, 108b to produce a co-ordinated output(s). In the example embodiment shown, the control devices 108a, 108b work in parallel to satisfy a certain demand or shared load 114, and which infer the value of one or more of each device output(s) properties by indirectly inferring them from other measured input variables and/or device properties. This co-ordination is achieved by using the inference application 514a, 514b which receives the measured inputs, to calculate or infer the corresponding individual output properties at each device 102 (e.g. head and flow at each device). From those individual output properties, the individual contribution from each device 102 to the load (individually to output properties 114) can be calculated based on the system/building setup. From those individual contributions, the co-ordination module 602 estimates one or more properties of the aggregate or combined output properties 114 at the system load of all the control devices 108a, 108b. The co-ordination module 602 compares with a setpoint of the combined output properties (typically a pressure variable), and then determines how the operable elements of each control device 108a, 108b should be controlled and at what intensity.

It would be appreciated that the aggregate or combined output properties 114 may be calculated as a linear combination or a non-linear combination of the individual output properties, depending on the particular property being calculated, and to account for losses in the system, as appropriate.

In some example embodiments, when the co-ordination module 602 is part of the first control device 108a, this may be considered a master-slave configuration, wherein the first control device 108a is the master device and the second control device 108b is the slave device. In another example embodiment, the co-ordination module 602 is embedded in more of the control devices 108a, 108b than actually required, for fail safe redundancy.

Referring still to FIG. 6, some particular example controlled distributions to the output subsystems 520a, 520b will now be described in greater detail. In one example embodiment, for example when the output subsystems 520a, 520b are associated with controlling device properties of equivalent type or performance, the device properties of each control pump 102 may be controlled to have equal device properties to distribute the flow load requirements. In other example embodiments, there may be unequal distribution, for example the first control pump 102a may have a higher flow capacity than the second control pump 102b (FIG. 1). In another example embodiment, each control pump 102 may be controlled so as to best optimize the efficiency of the respective control pumps 102 at partial load, for example to maintain their respective control curves 208 (FIG. 2) or to best approach Point B (212) on the respective control curve 208.

Referring still to FIG. 6, in an optimal system running condition, each of the control devices 108a, 108b are controlled by the co-ordination module 602 to operate on their respective control curves 208 (FIG. 2) to maintain the pressure setpoint at the output properties 114. This also allows each control pump 102 to be optimized for partial load operation. For example, as an initial allocation, each of the control pumps 102 may be given a percentage flow allocation (e.g. can be 50% split between each control device 108a, 108b in this example), to determine or calculate the required initial setpoint (e.g. Point A (210), FIG. 2). The percentage responsibility of required flow for each control pump 102 can then be determined by dividing the percentage flow allocation from the inferred total output properties 114. Each of the control pumps 102 can then be controlled along their control curves 208 to increase or decrease operation of the motor or other operable element, to achieve the percentage responsibility per required flow.

However, if one of the control pumps (e.g. first control pump 102a) is determined to be underperforming or off of its control curve 208, the co-ordination module 602 may first attempt to control the first control pump 102a to operate onto its control curve 208. However, if this is not possible (e.g. damaged, underperforming, would result in outside of operation range 202, otherwise too far off control curve 208, etc.), the remaining control pumps (e.g. 102b) may be controlled to increase their device properties on their respective control curves 208 in order to achieve the pressure setpoint at the required flow at the output properties 114, to compensate for at least some of the deficiencies of the first control pump 102a. Similarly, one of the control pumps 102 may be intentionally disabled (e.g. maintenance, inspection, save operating costs, night-time conservation, etc.), with the remaining control pumps 102 being controlled accordingly.

In other example embodiments, the distribution between the output subsystems 520a, 520b may be dynamically adjusted over time so as to track and suitably distribute wear as between the control pumps 102.

Figure 7:
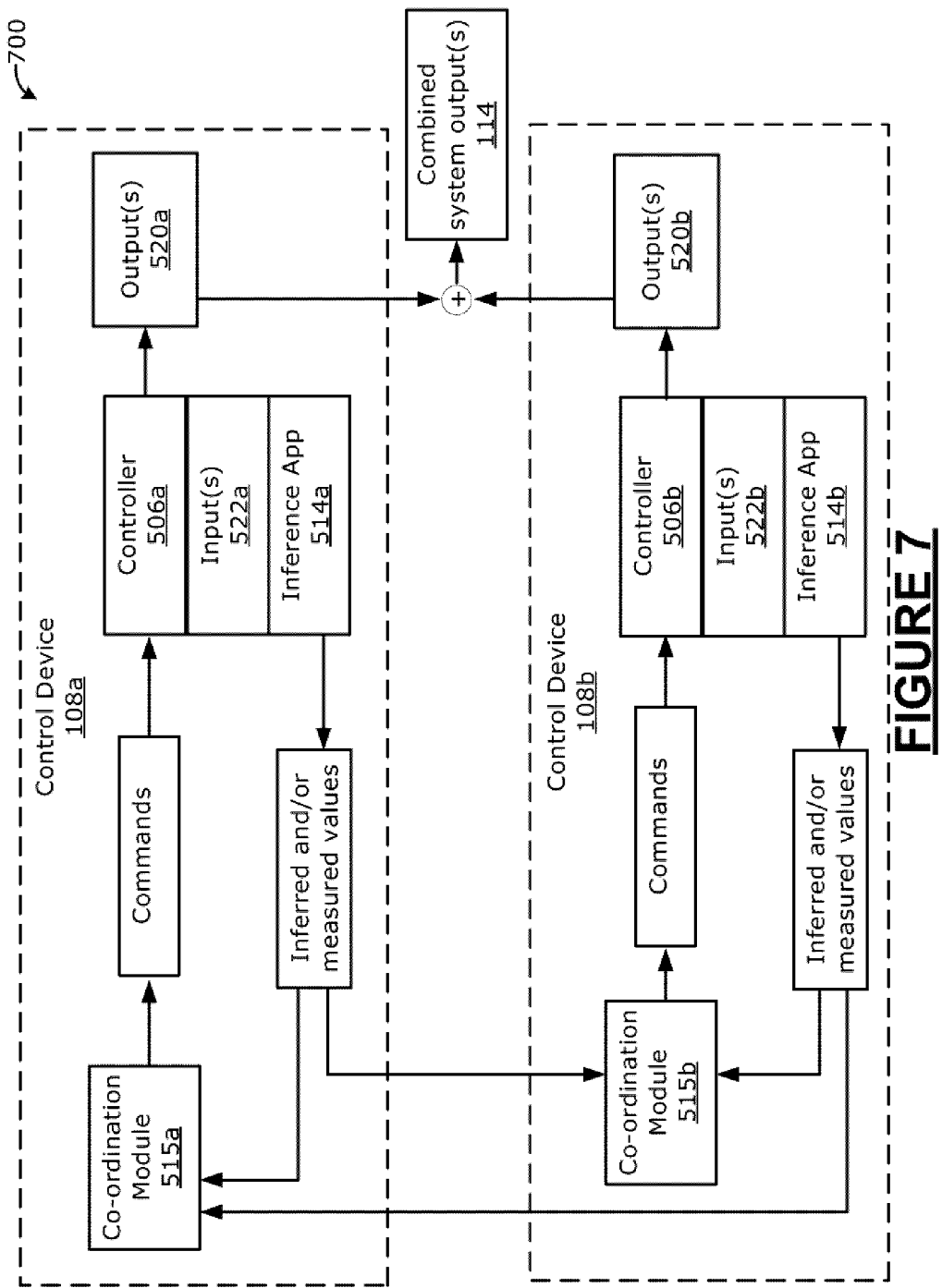
FIG. 7 illustrates another control system for co-ordinating control of devices, in accordance with another example embodiment.

Reference is now made to FIG. 7, which illustrates another example embodiment of a control system 700 for co-ordinating two or more sensorless control devices (two shown), illustrated as first control device 108a and second control device 108b. Similar reference numbers are used for convenience of reference. This may be referred to as a peer-to-peer system, in some example embodiments. An external controller 116 may not be required in such example embodiments. In the example shown, each of the first control device 108a and second control device 108b may control their own output subsystems 520a, 520b, so as to achieve a co-ordinated combined system output 114. As shown, each co-ordination module 515a, 515b is configured to each take into account the inferred and/or measured values from both of the input subsystems 522a, 522b. For example, as shown, the first co-ordination module 515a may estimate one or more output properties of the combined output properties 114 from the individual inferred and/or measured values.

As shown, the first co-ordination module 515a receives the inferred and/or measured values and calculates the individual output properties of each device 102 (e.g. head and flow). From those individual output properties, the individual contribution from each device 102 to the load (individually at output properties 114) can be calculated based on the system/building setup. The first co-ordination module 515a can then calculate or infer the aggregate output properties 114 at the load.

The first co-ordination module 515a then compares the inferred aggregate output properties 114 with a setpoint of the output properties (typically a pressure variable setpoint), and then determines the individual allocation contribution required by the first output subsystem 520a (e.g. calculating 50% of the total required contribution in this example). The first output subsystem 520a is then controlled and at a controlled intensity (e.g. increase, decrease, or maintain the speed of the motor, or other device properties), with the resultant co-ordinated output properties being again inferred by further measurements at the input subsystem 522a, 522b.

As shown in FIG. 7, the second co-ordination module 515b may be similarly configured as the first co-ordination module 515a, to consider both input subsystem 522a, 522b to control the second output subsystem 520b. For example, each of the control pumps 102 may be initially given a percentage flow allocation. Each of the control pumps 102 can then be controlled along their control curves 208 to increase or decrease operation of the motor or other operable element, based on the aggregate load output properties 114. The aggregate load output properties 114 may be used to calculate per control pump 102, the require flow and corresponding motor speed (e.g. to maintain the percentage flow, e.g. 50% for each output subsystem 520a, 520b in this example). Accordingly, both of the co-ordination modules 515a, 515b operate together to co-ordinate their respective output subsystems 520a, 520b to achieve the selected output setpoint at the load output properties 114.

As shown in FIG. 7, note that in some example embodiments each of the co-ordination modules 515a, 515b are not necessarily in communication with each other in order to functionally operate in co-ordination. In other example embodiments, not shown, the co-ordination modules 515a, 515b are in communication with each other for additional co-ordination there between.

Although example embodiments have been primarily described with respect to the control devices being arranged in parallel, it would be appreciated that other arrangements may be implemented. For example, in some example embodiments the controlled devices can be arranged in series, for example for a pipeline, booster, or other such application. The resultant output properties are still co-ordinated in such example embodiments. For example, the output setpoint and output properties for the load may be the located at the end of the series. The control of the output subsystems, device properties, and operable elements are still performed in a co-ordinated manner in such example embodiments. In some example embodiments the control devices can be arranged in a combination of series and parallel.

Variations may be made in example embodiments. Some example embodiments may be applied to any variable speed device, and not limited to variable speed control pumps. For example, some additional embodiments may use different parameters or variables, and may use more than two parameters (e.g. three parameters on a three dimensional graph). For example, the speed (rpm) is also illustrated on the described control curves. Further, temperature (Fahrenheit) versus temperature load (BTU/hr) may be parameters or variables which are considered for control curves, for example controlled by a variable speed circulating fan. Some example embodiments may be applied to any devices which are dependent on two or more correlated parameters. Some example embodiments can include selection ranges dependent on parameters or variables such as liquid, temperature, viscosity, suction pressure, site elevation and number of pump operating.

In example embodiments, as appropriate, each illustrated block or module may represent software, hardware, or a combination of hardware and software. Further, some of the blocks or modules may be combined in other example embodiments, and more or less blocks or modules may be present in other example embodiments. Furthermore, some of the blocks or modules may be separated into a number of sub-blocks or sub-modules in other embodiments.

While some of the present embodiments are described in terms of methods, a person of ordinary skill in the art will understand that present embodiments are also directed to various apparatus such as a server apparatus including components for performing at least some of the aspects and features of the described methods, be it by way of hardware components, software or any combination of the two, or in any other manner. Moreover, an article of manufacture for use with the apparatus, such as a pre-recorded storage device or other similar non-transitory computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present example embodiments.

While some of the above examples have been described as occurring in a particular order, it will be appreciated to persons skilled in the art that some of the messages or steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps of the conversations may be repeated, as necessary. Elements described as methods or steps similarly apply to systems or subcomponents, and vice-versa.

The term "computer readable medium" as used herein includes any medium which can store instructions, program steps, or the like, for use by or execution by a computer or other computing device including, but not limited to: magnetic media, such as a diskette, a disk drive, a magnetic drum, a magneto-optical disk, a magnetic tape, a magnetic core memory, or the like; electronic storage, such as a random access memory (RAM) of any type including static RAM, dynamic RAM, synchronous dynamic RAM (SDRAM), a read-only memory (ROM), a programmable-read-only memory of any type including PROM, EPROM, EEPROM, FLASH, EAROM, a so-called "solid state disk", other electronic storage of any type including a charge-coupled device (CCD), or magnetic bubble memory, a portable electronic data-carrying card of any type including COMPACT FLASH, SECURE DIGITAL (SD-CARD), MEMORY STICK, and the like; and optical media such as a Compact Disc (CD), Digital Versatile Disc (DVD) or BLU-RAY Disc.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art having the benefit of the present disclosure, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

The invention claimed is:

1. A flow control system, comprising:
two or more circulating devices each having a respective internal sensor and each having a respective operable element, each device having a communication subsystem and configured to self-detect two or more device properties, the device properties resulting in output having two or more output properties, wherein the two or more device properties include a speed variable of a variably controllable motor and an electrical variable of the variably controllable motor, and wherein the two or more output properties comprise a pressure variable and a flow variable;
at least one memory which stores, for each device, correlation data between the two or more device properties including the speed variable and the electrical variable and the two or more output properties for that device including the pressure variable and the flow variable; and
one or more controllers configured to, using sensor data only from the respective internal sensors and without using sensor data from an external sensor that is external to the devices:
detect the two or more device properties self-detected by each device,
correlate, for each device, based on the stored correlation data, the detected two or more device properties to the two or more output properties for that device, determine, for each device, a value of the pressure variable and the flow variable for that device which result in combined output of the devices achieving an output setpoint, and co-ordinate control of each device to operate their respective device properties of the speed variable and the electrical variable to achieve, based on the stored correlation data, their respective determined value of the pressure variable and the flow variable for that device.

2. The flow control system as claimed in claim 1, wherein the two or more device properties are correlated, and wherein the two or more output properties are correlated.

3. The flow control system as claimed in claim 2, wherein the pressure variable is a local pressure variable which is local to the devices.

4. The flow control system as claimed in claim 3, wherein the output setpoint is a remote pressure setpoint which is remote to the devices, wherein the speed variable of each device is controlled to achieve the remote pressure setpoint by achieving $H=H1+(HD-H1)*(Q/QD)^2$, wherein H is the correlated local pressure variable which is local to the devices, H1 is the remote pressure setpoint, HD is a local pressure at design conditions, Q is a total of the correlated flow variables and QD is a total flow at design conditions.

5. The flow control system as claimed in claim 4, wherein a number of the devices being operated (N) is increased when $H<HD*(Q/QD)^2*(N+0.5+k)$, and decreased if $H>HD*(Q/QD)^2*(N-0.5-k2)$, wherein k and k2 are constants to ensure a deadband around a sequencing threshold.

6. The flow control system as claimed in claim 2, wherein said correlating for each device is determined from a mapping from the two or more device properties to the two or more output properties.

7. The flow control system as claimed in claim 2, wherein each of the respective device properties are controlled to operate on a respective control curve defined by the two or more output properties.

8. The flow control system as claimed in claim 1, wherein the at least one of the respective device properties being operated is a speed variable.

9. The flow control system as claimed in claim 1, wherein each of the respective device properties are controlled to optimize efficiency at partial operation of the devices.

10. The flow control system as claimed in claim 1, wherein the combined output is an aggregate output to a varying load, wherein the varying load affects the detected two or more device properties.

11. The flow control system as claimed in claim 1, wherein the devices are arranged in at least one of a parallel configuration, a series configuration, or a combination of parallel and series configuration.

12. The flow control system as claimed in claim 1, wherein the output setpoint is fixed, continually or periodically calculated, or externally determined.

13. The flow control system as claimed in claim 1, wherein the two or more output properties relate to a remote location to the devices.

14. The flow control system as claimed in claim 1, wherein each device includes an output subsystem for controlling the operable element, wherein the operable element includes the device properties.

15. The flow control system as claimed in claim 1, wherein one device includes at least one of the controllers configured to perform said co-ordinating control.

16. The flow control system as claimed in claim 1, further comprising an external device to the devices configured to perform said co-ordinating control.

17. The flow control system as claimed in claim 1, wherein one device is configured to perform said correlating for each device.

18. A method for co-ordinating control of two or more circulating devices each having a respective internal sensor and each having a respective operable element, each device having a communication subsystem and configured to self-detect two or more device properties, the device properties resulting in output having two or more output properties, wherein the two or more device properties include a speed variable of a variably controllable motor and an electrical variable of the variably controllable motor, and wherein the two or more output properties comprise a pressure variable and a flow variable, wherein at least one memory stores, for each device, correlation data between the two or more device properties including the speed variable and the electrical variable and the two or more output properties for that device including the pressure variable and the flow variable, the method being performed using sensor data only from the respective internal sensors and without using sensor data from an external sensor that is external to the devices, the method comprising:

detecting the two or more device properties self-detected by each device;

correlating, for each device, based on the stored correlation data, the detected two or more device properties to the two or more output properties for that device;

determining, for each device, a value of the pressure variable and the flow variable for that device which result in combined output of the devices achieving an output setpoint; and co-ordinate control of each device to operate their respective device properties of the speed variable and the electrical variable to achieve, based on the stored correlation data, their respective determined value of the speed variable and the electrical variable for that device.

19. The method as claimed in claim 18, wherein the two or more device properties are correlated, and wherein the two or more output properties are correlated.

20. The method as claimed in claim 19, wherein the pressure variable is a local pressure variable which is local to the devices.

21. The method as claimed in claim 20, wherein the output setpoint is a remote pressure setpoint which is remote to the devices, wherein the speed variable of each device is controlled to achieve the remote pressure setpoint by achieving $H=H1+(HD-H1)*(Q/QD)^2$, wherein H is the correlated local pressure variable which is local to the devices, H1 is the remote pressure setpoint, HD is a local pressure at design conditions, Q is a total of the correlated flow variables and QD is a total flow at design conditions.

22. The method as claimed in claim 21, wherein a number of the devices being operated (N) is increased when $H<HD*(Q/QD)^2*(N+0.5+k)$, and decreased if $H>HD*(Q/QD)^2*(N-0.5-k2)$, wherein k and k2 are constants to ensure a deadband around a sequencing threshold.

23. The method as claimed in claim 19, wherein said correlating for each device is determined from a mapping from the two or more device properties to the two or more output properties.

24. The method as claimed in claim 19, wherein each of the respective device properties are controlled to operate on a respective control curve defined by the two or more output properties.

25. The method as claimed in claim 18, wherein the at least one of the respective device properties being operated is a speed variable.

26. The method as claimed in claim 18, wherein each of the respective device properties are controlled to optimize efficiency at partial operation of the devices.

27. The method as claimed in claim 18, wherein the combined output is an aggregate output to a varying load, wherein the varying load affects the detected two or more device properties.

28. The method as claimed in claim 18, wherein the devices are arranged in at least one of a parallel configuration, a series configuration, or a combination of parallel and series configuration.

29. The method as claimed in claim 18, wherein the output setpoint is fixed, continually or periodically calculated, or externally determined.

30. The method as claimed in claim 18, wherein the two or more output properties relate to a remote location to the devices.

31. The method as claimed in claim 18, wherein each device includes an output subsystem for controlling the operable element, wherein the operable element includes the device properties.

32. The method as claimed in claim 18, wherein one device is configured to perform said co-ordinating control.

33. The method as claimed in claim 18, wherein an external device is configured to perform said co-ordinating control.

34. The method as claimed in claim 18, wherein one device is configured to perform said correlating for each device.

35. A non-transitory computer readable medium having instructions stored thereon executable by one or more processors for co-ordinating control of two or more circulating devices each having a respective internal sensor and each having a respective operable element, each device having a communication subsystem and configured to self-detect two or more device properties, the device properties resulting in output having two or more output properties, wherein the two or more device properties include a speed variable of a variably controllable motor and an electrical variable of the variably controllable motor, and wherein the two or more output properties comprise a pressure variable and a flow variable, wherein at least one memory stores, for each device, correlation data between the one or more device properties including the speed variable and the electrical variable and the two or more output properties for that device including the pressure variable and the flow variable, the co-ordinating control being executed using sensor data only from the respective internal sensors and without using sensor data from an external sensor that is external to the devices, the instructions comprising:

instructions for detecting the two or more device properties self-detected by each device;
instructions for correlating, for each device, based on the stored correlation data, the detected two or more device properties to the two or more output properties for that device;
instructions for determining, for each device, a value of the pressure variable and the flow variable for that device which result in combined output of the devices achieving an output setpoint; and
instructions for co-ordinating control of each device to operate their respective device properties of the speed variable and the electrical variable to achieve, based on the stored correlation data, their respective determined value of the speed variable and the electrical variable for that device.

36. A circulating device for co-ordinating with one or more other circulating devices, each of the one or more other devices having a respective internal sensor and each having a respective operable element, each of the one or more other devices configured to self-detect two or more device properties, the device properties resulting in output having two or more output properties, wherein the two or more device properties include a speed variable of a variably controllable motor and an electrical variable of the variably controllable motor, and wherein the two or more output properties comprise a pressure variable and a flow variable, the circulating device comprising:

an operable element having the speed variable and the electrical variable;
an internal sensor configured to self-detect the two or more device properties including the electrical variable, the device properties resulting in output having the two or more output properties for the device;
memory for storing correlation data, for each device, between the two or more device properties including the speed variable and the electrical variable and the two or more output properties for that device including the pressure variable and the flow variable;
a controller configured to, using sensor data only from the respective internal sensor and without using data from sensor data from an external sensor that is external to the devices: correlate, for the device, based on the stored correlation data, the detected two or more device properties to the two or more output properties for the device, and configured to determine, for each device, a value of the pressure variable and the flow variable for each device which result in combined output of the devices achieving an output setpoint;
a communication subsystem for receiving, from at least one of the other devices, the detected two or more device properties or correlated two or more output properties of the one or more other devices, and for sending instructions to at least one of the other devices to co-ordinate control of each of the devices to operate their respective device properties of the speed variable and the electrical variable to achieve their respective determined value of the pressure variable and the flow variable for that device; and
an output subsystem for controlling the device properties of the speed variable and the electrical variable for the operable element of the device to achieve the determined value of the pressure variable and the flow variable of the device.

37. A circulating device for co-ordinating with one or more other circulating devices each having a respective internal sensor and each having a respective operable element, each of the one or more other devices configured to self-detect two or more device properties, the device properties resulting in output having two or more output properties, wherein the two or more device properties include a speed variable of a variably controllable motor and an electrical variable of the variably controllable motor, and wherein the two or more output properties comprise a pressure variable and a flow variable, the circulating device comprising:

an operable element having the speed variable and the electrical variable;
a controller;
an internal sensor configured to self-detect the two or more device properties, the device properties resulting in output having the two or more output properties for the device;
memory for storing correlation data between the two or more device properties including the speed variable and the electrical variable and the two or more output properties for the device including the pressure variable and the flow variable;
a communication subsystem for sending the detected two or more device properties or the correlated two or more output properties of the device based on the stored correlation data, and for receiving instructions to operate the device properties of the speed variable and the electrical variable of the device to co-ordinate, using sensor data only from the respective internal sensors and without using sensor data from an external sensor that is external to the devices, a respective value of the pressure variable and the flow variable of the devices for combined output to achieve an output setpoint; and
an output subsystem for controlling the device properties of the speed variable and the electrical variable for the operable element of the device, to achieve the instructed value of the pressure variable and the flow variable for the device.

38. A flow control system for sourcing a load, including:
a plurality of circulating devices each having a respective internal sensor and each including a respective circulating operable element arranged to source the load, each device configured to self-detect power and speed of the respective device;
at least one memory which stores, for each device, correlation data between device properties including the self-detected power and speed and output properties including pressure and flow for that device; and
one or more controllers configured to, using sensor data only from the respective internal sensors and without using data from an external sensor that is external to the devices:
correlate, for each device, based on the stored correlation data, the detected power and speed to the pressure and flow for that device,
determine, for each device, a value of the pressure and the flow for that device which result in combined output of the devices achieving a pressure setpoint at the load, and
co-ordinate control of each device to operate at least the respective circulating operable element to achieve, based on the stored correlation data, their respective determined value of the pressure and the flow for that device.

39. The flow control system as claimed in claim 1, wherein the flow control system further comprises a chilled circulating system including a refrigerant, wherein at least one device includes a compressor having a variably controllable motor having the two or more device properties resulting in the output properties including lift and flow for the refrigerant.

40. The flow control system as claimed in claim 1, wherein the flow control system further comprises an interface in thermal communication with a secondary circulating system and one or more cooling or heating elements at the interface, wherein a varying load for the combined output to achieve the output setpoint includes demand defined by the two or more cooling or heating elements.

41. The method as claimed in claim 18, for a chilled circulating system including a refrigerant, wherein at least one device includes a compressor having a variably controllable motor having the one or more device properties resulting in the output properties including lift and flow for the refrigerant.

42. The method as claimed in claim 18, for a temperature control system which includes an interface in thermal communication with a secondary circulating system and one or more cooling or heating elements at the interface, wherein a varying load for the combined output to achieve the output setpoint includes demand defined by the one or more cooling or heating elements.

43. The non-transitory computer readable medium as claimed in claim 35, for a chilled circulating system including a refrigerant, wherein at least one device includes a compressor having a variably controllable motor having the two or more device properties resulting in the output properties including lift and flow for the refrigerant.

44. The device as claimed in claim 36, for a chilled circulating system including a refrigerant, wherein the operable element further includes a compressor having a variably controllable motor having the one or more device properties resulting in the output properties including lift and flow for the refrigerant.

45. The device as claimed in claim 36, for a temperature control system which includes an interface in thermal communication with a secondary circulating system and one or more cooling or heating elements at the interface, wherein a varying load for the combined output to achieve the output setpoint includes demand defined by the two or more cooling or heating elements.

46. The device as claimed in claim 37, for a chilled circulating system including a refrigerant, wherein the operable element further includes a compressor having a variably controllable motor having the one or more device properties resulting in the output properties including lift and flow for the refrigerant.

47. The device as claimed in claim 37, for a temperature control system which includes an interface in thermal communication with a secondary circulating system and one or more cooling or heating elements at the interface, wherein a varying load for the combined output to achieve the output setpoint includes demand defined by the one or more cooling or heating elements.

48. A flow control system, comprising:
two or more devices including circulating devices each having a respective operable element, each device having a communication subsystem and configured to self-detect one or more device properties including an electrical variable, the device properties resulting in output having one or more output properties;
at least one memory which stores, for each device, correlation data between the one or more device properties including the electrical variable and the one or more output properties for that device; and
one or more controllers configured to:
detect inputs including the one or more device properties of each device,
correlate, for each device, based on the stored correlation data, the detected one or more device properties to the one or more output properties for that device, determine, for each device, a value of one or more output properties for that device which result in combined output of the devices achieving an output setpoint, and co-ordinate control of each device to operate at least one of their respective device properties to achieve, based on the stored correlation data, their respective determined value of one or more output properties for that device, wherein the one or more device properties comprise two or more device properties which are correlated, and wherein the one or more output properties comprise two or more output properties which are correlated, wherein the two or more device properties include a speed variable and a power variable, and wherein the two or more output properties comprise a local pressure variable and a flow variable, wherein the output setpoint is a remote pressure setpoint which is remote to the devices, wherein the speed variable of each device is controlled to achieve the remote pressure setpoint by achieving $H=H1+(HD-H1)*(Q/QD)^2$, wherein H is the correlated local pressure variable which is local to the devices, H1 is the remote pressure setpoint, HD is a local pressure at design conditions, Q is a total of the correlated flow variables and QD is a total flow at design conditions, and wherein a number of the devices being operated (N) is increased when $H<HD*(Q/QD)^2*(N+0.5+k)$, and decreased if $H>HD*(Q/QD)^2*(N-0.5-k2)$, wherein k and k2 are constants to ensure a deadband around a sequencing threshold.

49. A method for co-ordinating control of two or more devices including circulating devices each having a respective operable element, each device having a communication subsystem and configured to self-detect one or more device properties including an electrical variable, the device properties resulting in output having one or more output properties, wherein at least one memory stores, for each device, correlation data between the one or more device properties including the electrical variable and the one or more output properties for that device, the method comprising:

detecting inputs including the one or more device properties of each device;

correlating, for each device, based on the stored correlation data, the detected one or more device properties to the one or more output properties for that device;

determining, for each device, a value of one or more output properties for that device which result in combined output of the devices achieving an output setpoint; and co-ordinating control of each device to operate at least one of their respective device properties to achieve, based on the stored correlation data, their respective determined value of one or more output properties for that device, wherein the one or more device properties comprise two or more device properties which are correlated, and wherein the one or more output properties comprise two or more output properties which are correlated, wherein the two or more device properties include a speed variable and a power variable, and wherein the two or more output properties comprise a local pressure variable and a flow variable, wherein the output setpoint is a remote pressure setpoint which is remote to the devices, wherein the speed variable of each device is controlled to achieve the remote pressure setpoint by achieving $H=H1+(HD-H1)*(Q/QD)^2$, wherein H is the correlated local pressure variable which is local to the devices, H1 is the remote pressure setpoint, HD is a local pressure at design conditions, Q is a total of the correlated flow variables and QD is a total flow at design conditions, and wherein a number of the devices being operated (N) is increased when $H<HD*(Q/QD)^2*(N+0.5+k)$, and decreased if $H>HD*(Q/QD)^2*(N-0.5-k2)$, wherein k and k2 are constants to ensure a deadband around a sequencing threshold.

50. A non-transitory computer readable medium having instructions stored thereon executable by one or more processors for co-ordinating control of two or more devices including circulating devices each having a respective operable element, each device having a communication subsystem and configured to self-detect one or more device properties including an electrical variable, the device properties resulting in output having one or more output properties, wherein at least one memory stores, for each device, correlation data between the one or more device properties including the electrical variable and the one or more output properties for that device, the instructions comprising:

instructions for detecting inputs including the one or more device properties of each device;

instructions for correlating, for each device, based on the stored correlation data, the detected one or more device properties to the one or more output properties for that device;

instructions for determining, for each device, a value of one or more output properties for that device which result in combined output of the devices achieving an output setpoint; and instructions for co-ordinating control of each device to operate at least one of their respective device properties to achieve, based on the stored correlation data, their respective determined value of one or more output properties for that device, wherein the one or more device properties comprise two or more device properties which are correlated, and wherein the one or more output properties comprise two or more output properties which are correlated, wherein the two or more device properties include a speed variable and a power variable, and wherein the two or more output properties comprise a local pressure variable and a flow variable, wherein the output setpoint is a remote pressure setpoint which is remote to the devices, wherein the speed variable of each device is controlled to achieve the remote pressure setpoint by achieving $H=H1+(HD-H1)*(Q/QD)^2$, wherein H is the correlated local pressure variable which is local to the devices, H1 is the remote pressure setpoint, HD is a local pressure at design conditions, Q is a total of the correlated flow variables and QD is a total flow at design conditions, and wherein a number of the devices being operated (N) is increased when $H<HD*(Q/QD)^2*(N+0.5+k)$, and decreased if $H>HD*(Q/QD)^2*(N-0.5-k2)$, wherein k and k2 are constants to ensure a deadband around a sequencing threshold.

* * * * *